United States Patent [19]

Cibils Madero

[11] Patent Number: 4,751,542
[45] Date of Patent: Jun. 14, 1988

[54] LIGHT METERING SYSTEM WITH USER REFERENCE PRESELECTION CAPABILITY

[76] Inventor: Alberto Cibils Madero, San Martin 910, 11Fl., Buenos Aires, Argentina, 1004

[21] Appl. No.: 762,620

[22] Filed: Aug. 5, 1985

[30] Foreign Application Priority Data

Aug. 6, 1984 [AR] Argentina ............... 297487

[51] Int. Cl.⁴ .............................................. G03B 7/00
[52] U.S. Cl. ................... 354/410; 354/430; 354/433; 354/482
[58] Field of Search ............. 354/410, 429, 430, 433, 354/434, 482, 21, 469, 470

[56] References Cited

U.S. PATENT DOCUMENTS

| | | | |
|---|---|---|---|
| 3,550,730 | 3/1970 | Matsubara et al. | 354/482 |
| 3,580,149 | 5/1971 | Fujis | 354/482 |
| 3,780,631 | 12/1973 | Schulman | 354/482 |
| 4,041,308 | 8/1977 | Fujita | 354/482 |
| 4,079,388 | 3/1978 | Takahama et al. | 354/482 |
| 4,335,943 | 6/1982 | Numata | 354/482 |
| 4,391,500 | 7/1983 | Tsunekawa | 354/433 |
| 4,511,229 | 4/1985 | Schwartz et al. | 354/430 |

Primary Examiner—Russell E. Adams
Attorney, Agent, or Firm—Darby & Darby

[57] ABSTRACT

A light metering system which allows the user to select a color or gray scale reference for the system prior to operation of the apparatus (e.g. camera) with which the light metering system functions. The preselected reference chosen by the user takes into account values which will be recorded on an image recording element by the apparatus. The system is to be used on apparatus where shutter speed and diaphragm aperture settings are determined on the basis of the luminous power of the subject to be photographed taking into account the behavior of an element (e.g. film) on which the image is to be reproduced. The system includes a color selector mechanically associated with a color scale which, in turn, is directly related to a gray scale having a light intensity indicator. The light indicator is connected to a diaphragm aperture control device and to a shutter speed selector mechanism. The output of a light response curve selector of the element on which the image is to be reproduced is also connected to the diaphragm aperture control device. A preferred form of the diaphragm aperture control device is a microprocessor.

8 Claims, 3 Drawing Sheets

LIGHT METERING SYSTEM WITH USER REFERENCE PRESELECTION CAPABILITY

FIELD OF THE INVENTION

The present invention refers to an interactive light metering system and, specifically, to a new system that can be applied to all kinds of cameras: photographic, T.V., movies, as well as to hand-held light meters, introducing the luminosity value corresponding to the subject value for measuring the necessary luminous power. In this context, the term value refers to the property which distinguishes one color from another irrespective of hue and saturation.

BACKGROUND OF THE INVENTION

Nowadays, the technological improvements in cameras, lenses, films or reproduction material have been perfected to such an extent that taking pictures, movies or video is now reduced to its fundamentals, that is, aesthetic factors remain to be chosen: the subject, its composition, optical treatment, and the light. The first three factors are under full control of the user; however, the latter, the light, is not. Yet, light in a picture, scenography and evidently, photographs, movies or video is probably the determinant component governing in a subtle, albeit deep, way the aesthetic quality of the reproduction.

In substantial opposition to the degree of control over these fundamentals given to the user by the present technology, light is measured by light meters which operate based on a very primitive concept that has not evloved since its discovery. A light meter measures only the luminous power that reaches it. But nearly none of the subjects photographed have a luminous power of their own. In fact, they just reflect light. Therefore, this power depends basically on (a) the luminous power that reaches the subject, and (b) the reflecting characteristics of each particular subject, which vary according to its color, value (whereby "value" is considered as a grade of gray in a scale going from black to white) and superficial texture. The final result of the interaction of both variables is what finally reaches the light meter.

As an extreme example, we can obtain the same luminous power measuring two completely different subjects: a brightly lit navy blue subject and a dimly lit pale yellow subject. Present light meters are unable to tell the difference. But of course the user can do it.

All light meters, since the first simple ones to the sophisticated new models, handle this situation in the most primitive fashion. They assume that the subject—the light of which is being measured—always shows a color and/or value equal to a standard grade of gray which is universally accepted. Based on this assumption, they recommend in manual or automatic mode the shutter speed and diaphragm aperture settings needed to take a photograph, that is to say, those needed to reproduce that subject, whose luminosity value are unknown and have therefore been simply assumed as being equal to a standard grade of gray in the film as standard grade of gray. This fact is not well-known and the results may surprise.

Since the noted problem is so obvious in high contrast situations, very dark or very light subjects against very light or very dark backgrounds, different mechanisms have been incorporated in some cameras or light meters in order to perform primitive and empirical adjustments, with the advancements reached in micro electronics and computers, the problem is being dealt with in a way that seems very sophisticated but in fact continues being primitive: they compensate there high contrast situations by means of dividing the subject in partial areas, partial measurement of the light and their subsequent integration. But the problem that the light meter does not perceive the color and/or value of the subject remains untouched.

On the other hand, of the different reproduction means: film, orthicons or vidicons, etc., have a sensibility specturm to light which is completely different from the human eye-brain system. For instance, if the same subject is observed and photographed at constant shutter speed and diaphragm—aperture settings and lighted with an external source having L power, and in subsequent photographs the light is reduced to L/4 or L/32 and is then increased to 4L or 32L, the film will register the light reduction or increase with a higher magnitude than the human eye. All this leads to a fact that seems to have been forgotten: only the user knows what his subject is and how he wants it to be reproduced. And he knows this directly without any instrument. Therefore, the problem is to find the manner to provide the light meter with this information, generated by the most efficient of the processing systems: the human brain, instead of trying to obtain a minor and rather irrelevant part of this information, using costly and complex microelectronic gadgetry. Oddly, the latter seems to be the most popular alternative, but it will not lead too far.

The object of the present invention is to follow another, more practical, rational and suitable way. Basically, it consists of giving up the simplistic assumption of the standard gray and informing the light meter what colors and luminous values it is measuring and, above all, how they should be reproduced, and informing the light meter of the light sensitivity behavior of the film being used.

SUMMARY OF THE PRESENT INVENTION

In accordance with the invention, an interactive light metering system to be used on such instruments where shutter speed and diaphragm aperture settings are determined on the basis of the luminous power of the subject to be photographed, taking into account the light response behavior of an element on which the image is to be reproduced is characterized in that it comprises a color selector mechanically associated with a color scale directly related to a gray scale having a light intensity indicator, and said light indicator is also connected to diaphragm aperture control means and to a shutter speed selector mechanism, and the output of a light response curve selector of said element on which the image is to be reproduced is connected to said diaphragm aperture control means.

In a preferred embodiment of the invention, said diaphragm aperture control means are connected to the output of a standard gray/color selector in said preferred embodiment of the invention, said diaphragm aperture control means is a microprocessor to which the light intensity sensors are connected. In another preferred embodiment of the invention, the light intensity sensors of the instrument are connected to the shutter speed selector.

The main object and advantages of the present invention shall be better understood in the following description of a preferred embodiment of the invention with respect to the drawings.

DESCRIPTION OF THE PREFERRED EMBODIMENTS

Figure 1:
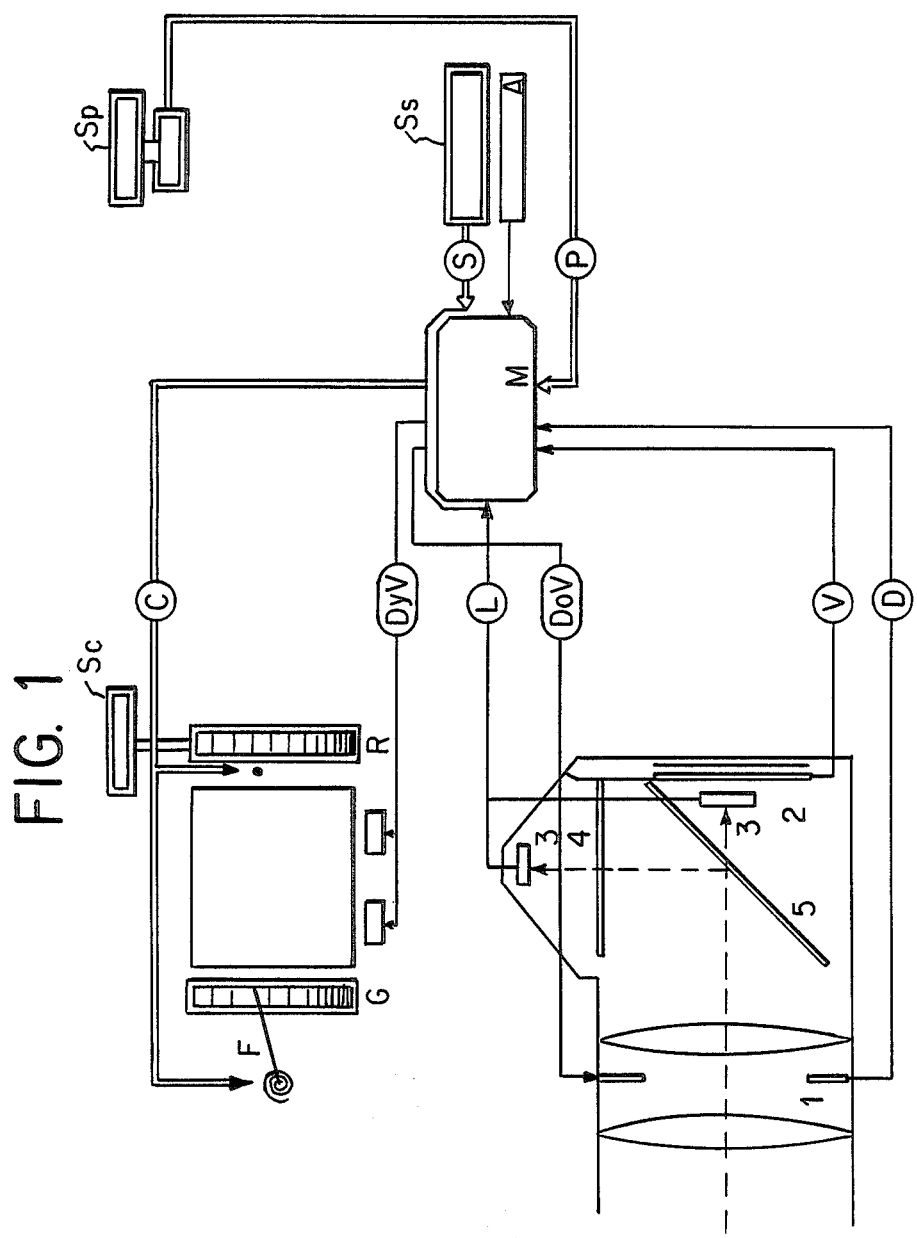
FIG. 1 is a schematic view of an automatic camera with a light meter incorporated in the viewfinder, in accordance with the invention.

Referring to FIG. 1, the invention here is applied to a photographic camera having a viewfinder through the lens (TTL) comprising a diaphragm 1, a shutter 2, their respective photocells 3 that receive the luminous or intensity power of the entire focused subject in one case and, in the other, of a spot or small area of the focus subject. These cameras form the image on the viewfinder 4 after reflection in mirror 5.

In modern photographic cameras, the diaphragm 1 and the shutter 2 have transducers providing signals D and V, respectively, which are received by a microprocessor M which, likewise, receives signal L from the photcells 3. In automatic cameras like the one shown in FIG. 1, the information on shutter speed and diaphragm aperture settings can be seen on the viewfinder, for the operator's information and one transmitted by the microprocessor M, through connections D and V.

Another aspect which must be considered when taking photographs is the light sensitivity behavior of the film, either ASA or DIN, supplied to the microprocessor M by selector A when film is produced in the camera.

In the drawings, a double stroke refers to those new elements and connections related to the object of the invention, the description of which is given below.

Selector $S_s$ determines the type of light sensitivity curve of the film, that is, its type of response to different magnitudes of luminous power applied to it. This information is provided by the manufacturer and varies according to the sensitivity of the material used in its manufacture. When the user wants to take a photograph in automatic mode, selector $S_p$ can predetermine the gray/color value to be obtained; the position transmitted by selecting $S_p$ is received by microprocessor M by means of connection P in order to adjust the diaphragm aperture 1 relative to the speed selected.

Since selector $S_c$ locates on the scale R the color selected automatically, the needle F of the instrument will indicate the gray value at scale G, or the color value at scale R, that the user has chosen with the $S_p$ selector. As shown in the description, besides the normal information in ordinary cameras, the operator must take into account the type of light sensitivity curve of the film S as well as select a standard gray or a color value on the predetermined scales; this standard or value selected shall be the one reproduced.

Figure 2:
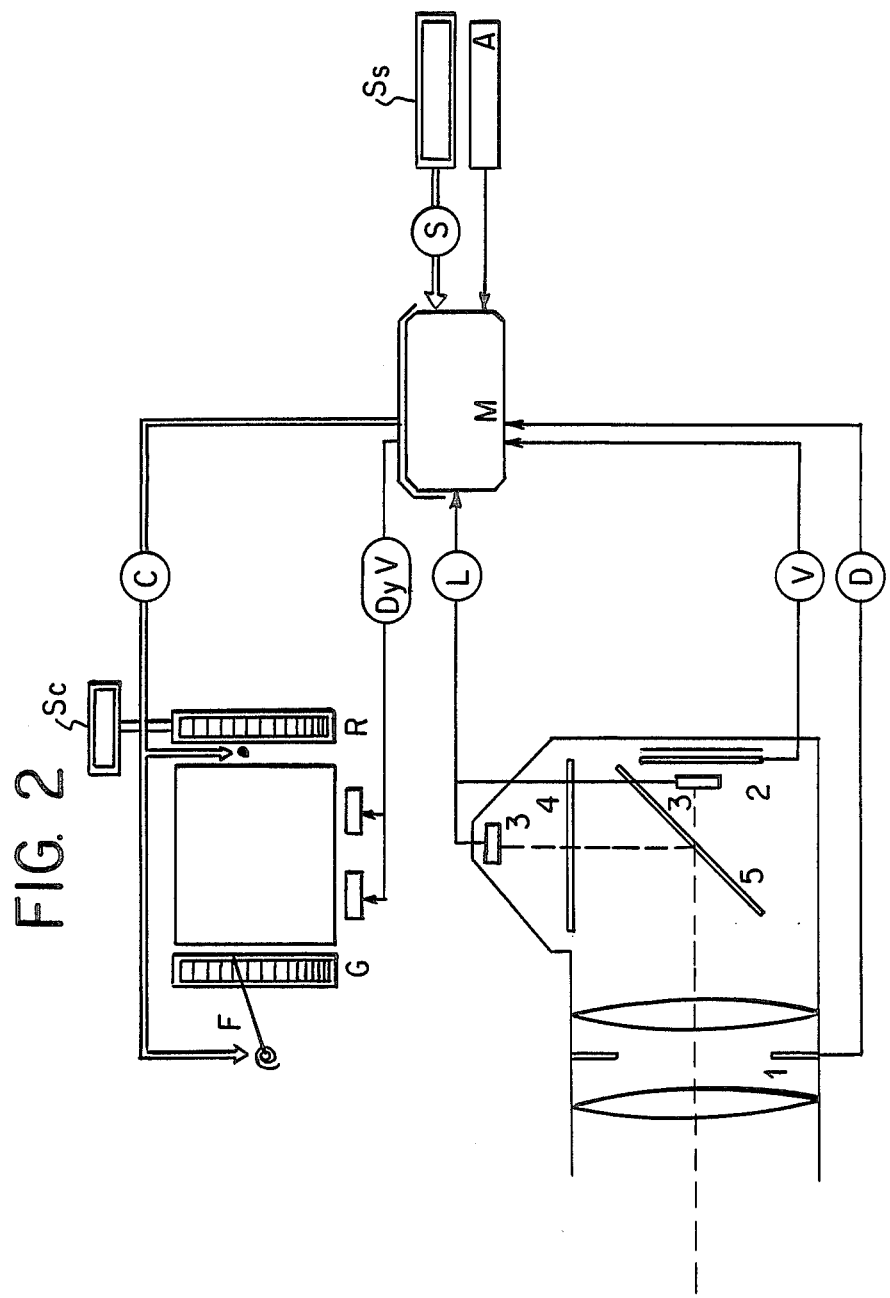
FIG. 2 is a schematic view of a manual camera with light meter incorporated in the viewfinder, in accordance with the present invention.
Figure 3:
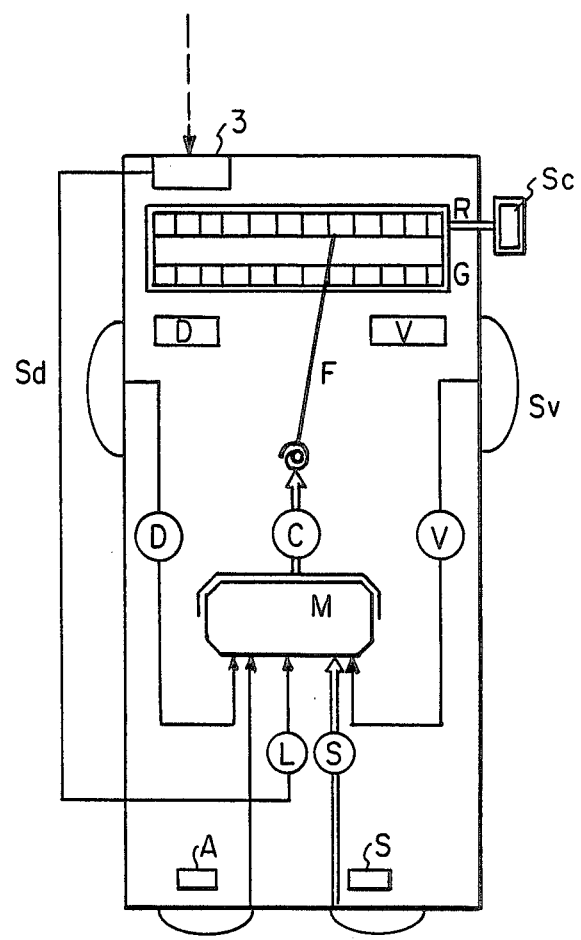
FIG. 3 is an external light meter or independent from the viewfinder in accordance with the present invention.

FIG. 2 shows the invention applied to a manual camera in which the $S_p$ value selector is omitted. FIG. 3 shows a light meter that is not incorporated on the camera, and which, besides the diaphragm select or $S_d$, speed selector $S_v$ and standard present sensitivity behavior of the film selector A, has a color selector, a type of light sensitivity curve selector S and the scales of gray G and of color R to determine through the needle F the characteristics of the phtotgraphs.

In accordance with the present invention, the implementation of the inventive concept is obtained via two interrelated basic systems:

System A: All light meters work either by (a) needle alignment or electronic display; or (b) direct automatic transmission of the light intensity information to the diaphragm aperture and shutter speed controls, always assuming that the subject has a standard gray vlaue. The invention proposes to continue with the same method of needle alignment or electronic display but matching them against a gray scale and/or color scale graduated by luminous value as seen by the operator instead of against a fixed point generated by the standard grade of gray assumption. Therefore, it is the user who selects one or more grades of gray or values he wants to reproduce and these selected grades then become the specific standard for a particular picture, a standard that can be varied by the user at will.

System B: Informing the type of light response curve of the film or video cell. The present ASA/DIN information provides just one single average light response value—always referred to the standard gray. The present invention thus also proposes to inform the type of light response curve that the film (or video cell) has.

System A is materialized in any of the present light metering devices: manual, incorporated, direct, through-the-lens, received or reflected light, direct or measured at, the viewfinder, spot, averaged, preferential areas, single or divided screens, integrators, memories, etc., under the following conditions:

1. That the light meter, or the camera's viewfinder when incorporated in the camera, presents a scale of grays going from black to white. This is done directly, without any particular device other than those need to light the scale.

2. That it also has another color scale, parallel to the gray scale, arranged in such a way that the values of each color are equal and similar to those shown by the gray scale at the same height. In order to simplify the operation, the user may select on the color scale the color(s) he wants to use as a standard according to the subject(s) he wants to reproduce. Besides the original rainbow colors, the scale preferably displays the brown and flesh hues.

In summary, this scale of colors is preferably arranged according to a cylindrical concept: the colors acting as meridians and their respective values as parallels, from the darkest to the lightest. All this preferably is effected by a transition and not abruptly. The key color is selected by rotation of a control dial.

3. In manual light meters or in manual cameras with incorporated light meters, a needle or electronic indicator moving alongside or over the gray and color scales, based on (a) the light measured by the light meter; (b) the information provided by System B; and (c) the relative position of variators of the light energy received by the film, diaphragm aperture and speed.

4. In cameras having automatic diaphragm aperture and shutter speed value settings and with incorporated light meters, a standard value selector operated by the user. This selector informs the microcomputer generally incorporated in the above-mentioned cameras what value of gray/color is to be reproduced and, by means of the needle or electronic indicator, shows the user on the viewfinder scale the standard value selected and the diaphragm aperture and speed.

System B implies:

1. The type of light response curve of the different films or video cells and their codification.

2. A system to translate the above-mentioned information to the light meter or camera by means of a dial, buttons, keys, magnetic media, etc. For example, all the information is of the ASA 100-C or DIN 21C kind and is introduced to cameras with incorporated microelectronics by means of a flat keyboard located inside the loading film cover, avoiding therefore the use of a mechanical dial outside, etc.

A camera equipped with this invention can be initially used as any ordinary one. If the camera is automatic, the user sees the needle or electronic indicator pointing to the standard gray and value. If the camera is manual or being automatic in manual mode, the user sees the need or electronic indicator pointing to the gray and/or color value to be reproduced by the camera at the diaphragm aperture and shutter speed settings established.

The advantage of the present invention is as follows. In order to obtain a much more precise control over the reproduction vis-a-vis, what his eye really sees or what he wants the photograph to look like, the user should if he gets used to work with values of gray, operate the standard selector in automatic mode, or the diaphragm aperture and shutter speed controls in manual mode in order to move the needle or electronic indicator to the gray value he prefers to reproduce. If he wants to be sure of the results by means of comparing colors, he should select and cause to appear the color scale he prefers and then move the needle or indicator to that color he wants reproduced as described previously.

In summary, the user operates by means of an analogical comparison with the subject being photographed or with his idea of what he want to reproduce. As said before, all this is perfectly compatible with all systems of finder information on shutter speed aperture settings or light metering. The implementation of the present invention is somewhat complex if it is exclusively done mechanically, but it is relatively simple when using microelectronic means at present available. What is required is to abandon the false idea of "absolute" inherent to the present standard gray metering systems and to adopt the "relative" concept of a standard value variable at the user's will. The invention not only is applicable to amateur, professional or scientific photography but also to movies and video. In any case, it will allow a greater fidelity of the photographic reproduction, both with respect to reality or to any special effect, substantially reducing the risks of the present "empiricism". Professional photographers will find this tool very valuable in saving time and effort. Amateurs, the greatest consumer of equipment and films, will dramatically improve the aesthetic quality and reliability of those photographs that nowadays look absolutely dull and uninteresting. We must not forget that in the quality of the photograph, considering that the problem of focusing and shutter speed is nowadays solved, light control and the subsequent selection of grays and colors is definitely more important than the subject and its composition.

While the foregoing description and drawings represent the preferred embodiments of the present invention, it will be obvious to those skilled in the art that various changes and modifications may be made therein without departing from the true spirit and scope of the present invention.

I claim:

1. An interactive light metering system to be applied to instruments on which the shutter speed and diaphragm aperture are determined on the basis of the luminous power of the subect to be photographed, comprising:
   (a) light measuring and information means for measuring the light power emitted or reflected by the subject;
   (b) diaphragm setting information means for providing information of the aperture setting of the camera diaphragm;
   (c) shutter speed setting information means for providing information of the shutter speed setting of the camera's shutter;
   (d) standard film sensitivity information means for providing information of the standard ASA/ISO/DIN sensitivity of the film being used;
   (e) light sensitivity curve type information means for providing information of the type of response that the film used has, as values to be reproduced as a function of light energy received;
   (f) a scale of grays, showing all the luminosity values from black to white, visible to the operator;
   (g) means for displaying all the luminosity values scales of all main colors, as selected by the operator;
   (h) means to indicate a specific value on said scales (f) and (g); and
   (i) computing means receiving as inputs said (a), (b), (c), (d) and (e) information and producing as an output the luminosity value that will be printed on the film according to those inputs, said output also being displayed to the user by the (h) means.

2. A system as described in claim 1, wherein there is a plurality of light measuring means, measuring different areas of the frame, as selected by the user.

3. A system as described in claim 2, wherein information of the different areas of the frame being measured is provided and displayed for the operator's knowledge.

4. In a camera having an interactive light metering system to be applied to instruments on which the shutter speed and diaphragm aperture are determined on the basis of the luminous power of the subject to be photographed, comprising:
   (a) light measuring and information means for measuring the light power emitted or reflected by the subject;
   (b) diaphragm setting information means for providing information of the aperture setting of the camera diaphragm;
   (c) shutter speed setting information means for providing information of the shutter speed setting of the camera's shutter;
   (d) standard film sensitivity information means for providing information of the standard ASA/ISO/DIN sensitivity of the film being used;
   (e) light sensitivity curve type information means for providing information of the type of response that the film used has, as values to be reproduced as a function of light energy received;
   (f) a scale of grays, showing all the luminosity values from black to white, visible to the operator;
   (g) means for displaying all the luminosity values scales of all main colors, as selected by the operator;

(h) means to indicate a specific value on said scales (f) and (g); and (i) computing means receiving as inputs said (a), (b), (c), (d) and (e) information and producing as an output the luminosity value that will be printed on the film according to those inputs, said output also being displayed to the user by the (h) means, and wherein the diaphragm setting information means is directly linked by a linking means to the camera's diaphragm setting means, thus automatically generating the setting information as the diaphragm is being set and wherein the shutter speed information means is directly linked by a linking means to the camera's shutter speed setting means, thus automatically generating the setting information as the shutter speed is being set.

5. A camera as described in claim 4, incorporating means to display at a camera finder the settings of diaphragm and/or shutter speed.

6. A camera as described in claim 4 or 6, also including:

setting means which are governed by specific outputs from the computing means, automatically setting the diaphragm and/or the shutter speed;

value selecting means to preselect a value to be reproduced that will be displayed by the indicating means on the (f) and (g) scales, said value selecting means providing an input to the computing means which will produce an output needed for said display; and said computing means adapted to receive the input from said value selecting means and producing the output needed for display.

7. A camera as described in claim 6, including means to preselect a determined diaphragm aperture or a predetermined shutter speed or one or various preferred combinations of aperture and speed for supplying inputs to the computing means adapted to receive those inputs.

8. A camera as described in claim 6, including means to select, memorize and/or average different values for different areas of the subject.

* * * * *